No. 808,162. PATENTED DEC. 26, 1905.
J. MILLER, Jr.
ELECTRIC TROLLEY WHEEL.
APPLICATION FILED MAR. 17, 1905.
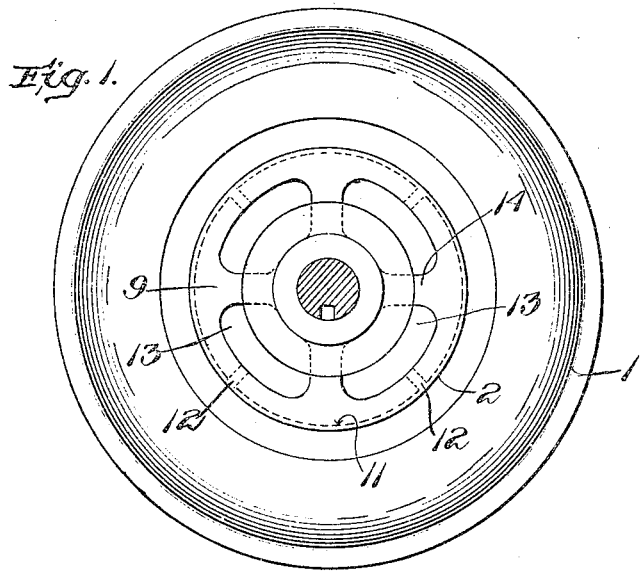
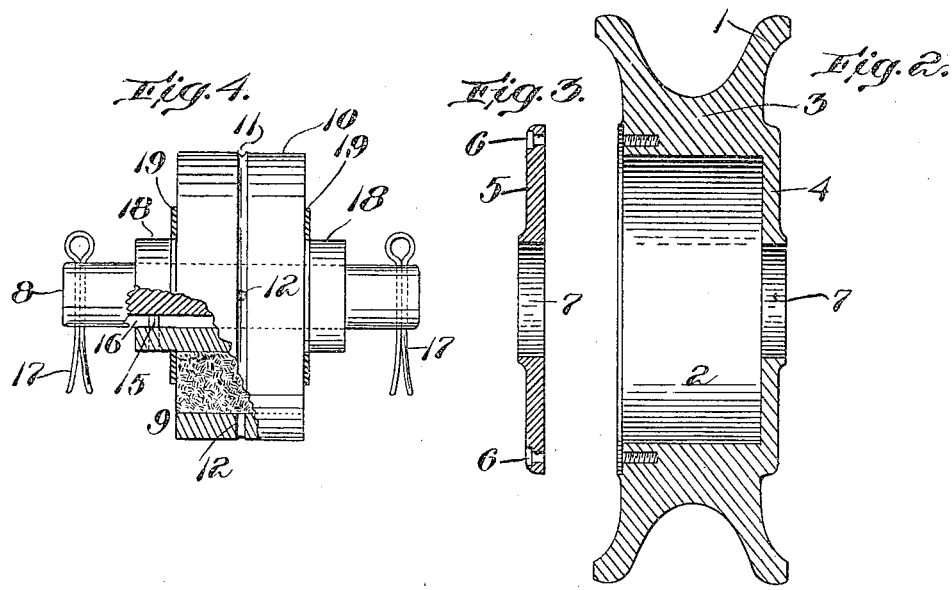
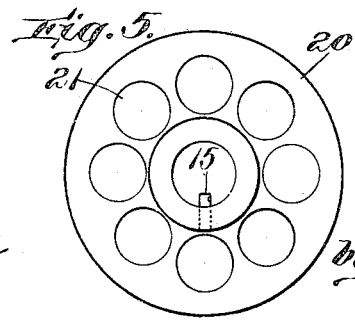
Witnesses:
Inventor:
John Miller, Jr,
by Geo. H. Maxwell
Attorney.

UNITED STATES PATENT OFFICE.

JOHN MILLER, JR., OF AMESBURY, MASSACHUSETTS, ASSIGNOR TO WILLIAM E. BIDDLE, OF AMESBURY, MASSACHUSETTS.

ELECTRIC TROLLEY-WHEEL.

No. 808,162.        Specification of Letters Patent.        Patented Dec. 26, 1905.

Application filed March 17, 1905. Serial No. 250,555.

*To all whom it may concern:*

Be it known that I, JOHN MILLER, Jr., a citizen of the United States, residing at Amesbury, in the county of Essex and State of Massachusetts, have invented an Improvement in Electric Trolley-Wheels, of which the following description, in connection with the accompanying drawings, is a specification, like figures on the drawings representing like parts.

My invention relates to trolley-wheels for electric railways, and has for its object the provision of means for maintaining proper lubrication without any waste or spattering and dripping of the lubricant.

Trolleys are usually lubricated simply by pouring in more or less oil in usual manner, and this oil drips on the car and runs onto the adjacent harp and trolley portions, where it gathers dust and in general becomes a nuisance, so that frequently it is found preferable to permit the wheels to wear out rapidly without oil rather than run the risk of injury and disfigurement to the trolley mechanism and car due to oil. My invention aims to avoid all these objectionable conditions.

I provide a stationary axle or shaft and enlarged hub or bearing, surrounded by a wheel-periphery traveling thereon, said hub and the surrounding cavity of the trolley being large, so as to generate sufficient friction for melting just enough of a semisolid lubricant contained in the hub to keep the said peripheral surface properly lubricated and no more.

One advantage of my invention is that whenever the trolley is not in use the lubricant solidifies and ceases to flow instead of continuing to drip as previously. Another advantage is that the trolley needs no attention for long periods of time, but maintains automatic lubrication, coupled with absolutely neat condition and appearance, and a further important advantage is that the large peripheries tend to maintain the parts in proper alinement for a long period, thereby preventing tipping and wabbling of the trolley and jumping the wire, commonly due to the wearing of an elongated bearing in the trolley running on a small ordinary axle.

The constructional details of my invention will be pointed out in the course of the following description, reference being had to the accompanying drawings, in which I have shown a preferred embodiment of my invention.

In the drawings, Figure 1 is a view in side elevation of a trolley-wheel constructed according to my invention. Fig. 2 is a central vertical transverse sectional view of the wheel-periphery or shell. Fig. 3 is a similar sectional view of the cover-plate or retaining-ring. Fig. 4 is a view, partly in section and mainly in side elevation, of the axle and bearing; and Fig. 5 is a view in side elevation of a modified construction of bearing or hub.

The external shape of the trolley-wheel 1 will conform to the requirements or preferences of any given situation. The center of the trolley-wheel is cut away or provided with a large cavity 2, leaving a wall 3 next to the wire-engaging periphery and relatively thin sides 4 5. One of the latter is herein shown as removable and constituting a cover-plate or retaining-ring secured by screws at 6 or by other means. The cover-plate 5 and opposite side 4 are centrally apertured at 7 to receive the bearing.

On any suitable stationary shaft or axle 8 I mount a special hub-like bearing 9 to fit the cavity 2, having a large and wide cylindrical periphery 10, grooved at 11 and preferably provided with holes 12 for distributing the lubricant. This bearing is "large," by which I mean that its diameter is considerably greater than the width of the bearing-surface 10. The hub-like bearing 9 is provided with transverse openings, four large openings 13 being shown in Fig. 1. In other words, the bearing, as shown in Figs. 1 and 4, consists of a wheel-like member the rim of which is supported on spoke-like walls 14. This hub-bearing is preferably made separate from the shaft or axle 8 and slidingly mounted thereon, having a pin 15 engaging a keyway 16 for maintaining the parts against rotation, the shaft being held stationary by any suitable means, as by cotter-pins 17, which, it will be understood, pass through the trolley-harp in obvious manner.

The bearing 9 is preferably provided with opposite shoulders or hub-like extensions 18, fitting the holes 7 of the shell for giving steadiness of position, and on these ends 18 are small washer-like retainers, which serve to cover up more or less of the ends of the bodies of lubricant contained in the wheel-like bearing 9. As the lubricant-holder or bearing 9 becomes gently heated it thereby renders the normally approximately solid lubricant more or less plastic, and the rings or retainers 19 prevent these bodies of lubricant from bulging out and tending to run; but as they do not enirely close the lubricant-openings the lubricant is free to escape sufficiently for lubricating purposes.

In Fig. 5 I have shown at 20 a modified construction of bearing. The general shape is the same as shown in Fig. 4, excepting that the lubricant is contained in a greater number of smaller pockets or chambers, which are indicated at 21 as being cylindrical in shape. In this construction more metal remains and greater frictional heat is required to soften the lubricant.

From the foregoing description it will readily be seen that my invention has a number of radically-distinctive features both of construction and of operation. In the first place the shell or wheel proper, 1, is maintained in true vertical alinement and steady position by reason of the fact that its large annular surface 2 and side portions 4, 5, and 7 are supported on the correspondingly large peripheral bearing-surface 10 and the smaller shoulders 18. In the next place the surface 10 is not only large, but cylindrical and wide, so that the internal bearing-surface 2 of the wheel engages a large area thereof and produces at first a considerable friction. Normally there is no appreciable lubricant on the surfaces, but the lubricant remains in approximately solid form in several bodies or portions packed within the member 9; but as the wheel begins to revolve on the bearing the friction generated by these large contacting surfaces heats the lubricant just barely enough to cause an exceedingly-slight exudation of the lubricant into the groove 11 and down on the outer ends of the lower side of the member 9 until the two cylindrical bearing-surfaces are fully lubricated. This condition is automatically maintained as long as the trolley continues to revolve, and the moment that it stops the lubrication ceases automatically, because of the cessation of the frictional heat.

My invention does not consist simply of a wheel mounted on a hub-like lubricant-carrying bearing, but it resides in making this bearing of such size and shape as to accomplish the new results above explained and in filling the bearing with solid or semisolid grease as distinguished from free-running oil and in so constructing said bearing that this grease may be softened or melted appreciably and caused to flow slightly, but not copiously. The result is that in practice my invention, although carrying a large supply of lubricant sufficient for a long term of service, yet remains substantially as neat and clean as if it were running dry.

Having described my invention, what I claim as new, and desire to secure by Letters Patent of the United States, is—

1. A trolley-wheel, comprising a stationary axle, and a stationary, hollow, perforate, hub-like bearing, adapted to contain a lubricant, whose diameter is greater than the width of the peripheral bearing-surface thereof, and whose peripheral wall is thin for readily transmitting heat, and a rotary wire-engaging portion having a thin peripheral wall parallel to said axle and whose inner surface fits directly in contact with said peripheral bearing-surface, and whose outer surface engages the trolley-wire.

2. A trolley-wheel, comprising a stationary axle and hollow hub-like bearing filled with approximately solid lubricant capable of melting under heat, and a rotary wire-engaging periphery, said periphery and bearing having extensive bearing-surfaces of large diameter for producing excessive frictional heat, and openings from said hollow bearing for giving said lubricant access to said bearing-surfaces under the action of said heat.

3. A trolley-wheel, comprising a stationary axle and hollow hub-like bearing filled with approximately solid lubricant capable of melting under heat, and a rotary wire-engaging periphery, said periphery and bearing having extensive bearing-surfaces of large diameter for producing excessive frictional heat, said hollow bearing being formed with transverse chambers open at their ends for containing said lubricant.

4. A trolley-wheel, comprising a shell-like rotary periphery, and a stationary axle and hub-like bearing fitting within said periphery, said bearing having transverse open-ended lubricant-chambers, adapted to contain a normally non-flowing lubricant packed therein, and retaining means partially closing said open-ended chambers.

5. A trolley-wheel, comprising a shell-like rotary periphery, and a stationary axle and hub-like bearing fitting within said periphery, said bearing having transverse open-ended lubricant-chambers, adapted to contain a normally non-flowing lubricant packed therein, and ring-like retaining means partially closing said open-ended chambers.

6. A trolley-wheel, comprising a shell-like rotary periphery, and a stationary axle and removable hub-like bearing fitting within said periphery, said bearing having transverse open-ended lubricant-chambers, adapted to contain a normally non-flowing lubricant packed therein, and retaining means partially closing said open-ended chambers.

7. A trolley-wheel, comprising a shell-like rotary periphery having a removable side, an axle, and a removable lubricant-carrying device having side entrance within said periphery for supplying lubricant to the bearing-surface of the trolley-wheel, said lubricant-carrying device having chambers adapted to be charged with lubricant before being applied to the trolley-wheel.

In testimony whereof I have signed my name to this specification in the presence of two subscribing witnesses.

JOHN MILLER, JR.

Witnesses:
GEO. H. MAXWELL,
WM. E. BIDDLE.